(12) United States Patent
Andrianov

(10) Patent No.: US 9,116,747 B2
(45) Date of Patent: Aug. 25, 2015

(54) SPARSE THREADED DETERMINISTIC LOCK-FREE CHOLESKY AND LDLT FACTORIZATIONS

(75) Inventor: Alexander Andrianov, Cary, NC (US)

(73) Assignee: SAS Institute Inc., Cary, NC (US)

( * ) Notice: Subject to any disclaimer, the term of this patent is extended or adjusted under 35 U.S.C. 154(b) by 502 days.

(21) Appl. No.: 13/527,670

(22) Filed: Jun. 20, 2012

(65) Prior Publication Data

US 2013/0346984 A1 Dec. 26, 2013

(51) Int. Cl.
*G06F 9/50* (2006.01)
*G06F 17/16* (2006.01)

(52) U.S. Cl.
CPC .............. *G06F 9/5038* (2013.01); *G06F 17/16* (2013.01); *G06F 2209/506* (2013.01)

(58) Field of Classification Search
None
See application file for complete search history.

(56) References Cited

U.S. PATENT DOCUMENTS

| | | | |
|---|---|---|---|
| 6,601,080 B1 * | 7/2003 | Garg ............................. | 708/502 |
| 7,792,895 B1 * | 9/2010 | Juffa et al. ..................... | 708/607 |
| 8,788,556 B2 * | 7/2014 | Zhang et al. .................. | 708/400 |
| 8,805,912 B2 * | 8/2014 | Nakanishi ..................... | 708/446 |
| 2007/0143759 A1 * | 6/2007 | Ozgur et al. .................. | 718/102 |

OTHER PUBLICATIONS

Yinglong Xia; Hierarchical Scheduling of DAG Structured Computations on Manycore Processors with Dynamic Thread Grouping; JSSPP 2010, LNCS 6253, pp. 154-174, 2010.*

Hogg J.D. et al., "A DAG-based Sparse Cholesky Solver for Multicore Architectures" Technical Report, Science and Technology Facilities Council, ISSN 1358-6254, Apr. 27, 2009, 20 pages.*
Hogg J.D. et al., "Achieving bit compatibility in sparse direct solvers" Science and Technology Facilities Council, Preprint RAL-P-2012-005, ISSN 1361-4762, Oct. 2012, 13 pages.*
Stanimire Tomov; Dense Linear Algebra Solvers for Multicore with GPU Accelerators; IEEE 2010; 8 pages.*
Heejo Lee; Task Scheduling using a Block Dependency DAG for Block-Oriented Sparse Cholesky Factorization; 1999 ACM; 8 pages.*
Demmel et al., "A Supernodal Approach to Sparse Partial Pivoting", Siam J. Matrix Anal. Appl. vol. 20, No. 3, pp. 720-755, 1999 Society for Industrial and Applied Mathematics.
Gupta, Anshul, "WSMP: Watson Sparse Matrix Package, Part I—Direct Solution of Symmetric Sparse Systems", IBM Research Report, Version 12.1, RC 21886 (98462) Nov. 16, 2000 (Last update: Jan. 23, 2012), 50 pages.
HSL_MA97, Science & Technology Facilities Council, Package Specification, Jan. 9, 2012, 18 pages.

(Continued)

*Primary Examiner* — Abdullah Al Kawsar
(74) *Attorney, Agent, or Firm* — Kilpatrick Townsend & Stockton LLP

(57) ABSTRACT

Systems and methods are provided for implementing a sparse deterministic direct solver. The deterministic direct solver is configured to identify at least one task for each of a plurality of dense blocks, identify operations on which the tasks are dependent, store in a first data structure an entry for each of the dense blocks identifying whether a precondition must be satisfied before tasks associated with the dense blocks can be initiated, store in a second data structure a status value for each of the dense blocks that is changeable by multiple threads, and assign the tasks to a plurality of threads, wherein the threads execute their assigned task when the status of the dense block corresponding to their assigned task indicates that the assigned task is ready to be performed and the precondition associated with the dense block has been satisfied if the precondition exists.

51 Claims, 20 Drawing Sheets

(56) References Cited

OTHER PUBLICATIONS

Hogg et al., "Design of a Multicore Sparse Cholesky Factorization using DAGs", Science & Technology Facilities Council, Dec. 23, 2009, 20 pages.

Kurzak et al., "Implementing Linear Algebra Routines on Multi-Core Processors with Pipelining and a Look Ahead", University of Tennessee, Knoxville, TN, pp. 147-156, 2007.

Pardiso, User Guide Version 4.1.2, Schenk and Gartner, Feb. 12, 2011, 58 pages.

* cited by examiner

SPARSE THREADED DETERMINISTIC LOCK-FREE CHOLESKY AND LDLT FACTORIZATIONS

FIELD

The technology described in this patent document relates generally to computer-implemented systems for solving linear algebraic problems. In particular described herein are new ways of implementing sparse deterministic direct solvers such as Cholesky and $LDL^T$ without using locks.

BACKGROUND

In sparse linear algebra, Cholesky and $LDL^T$ factorizations of symmetric matrices are of importance due to their large applicability in optimization, partial differential equations, and many other areas of scientific computing. When developing threaded versions of these factorizations, it is important to have the ability to reproduce the results of computations. When this happens, the factorizations are called deterministic. Also, solutions that do not use explicit locking mechanisms are easier to port and implement with different hardware and operating systems.

SUMMARY

In accordance with the teachings described herein, systems and methods are provided for implementing a sparse deterministic direct solver. The deterministic direct solver is configured to analyze a symmetric matrix by defining a plurality of dense blocks, identify at least one task for each of the dense blocks, and identify for each task any operations on which the task is dependent. The deterministic direct solver is further configured to store in a first data structure an entry for each of the dense blocks identifying whether a precondition must be satisfied before tasks associated with the dense blocks can be initiated, store in a second data structure a status value for each of the dense blocks and make the stored status values changeable by multiple threads, and assign a plurality of the tasks to a plurality of threads, wherein each thread is assigned a unique task, wherein each of the plurality of threads executes its assigned task when the status of the dense block corresponding to its assigned task indicates that the assigned task is ready to be performed and the precondition associated with the dense block has been satisfied if the precondition exists.

DETAILED DESCRIPTION

Figure 1:
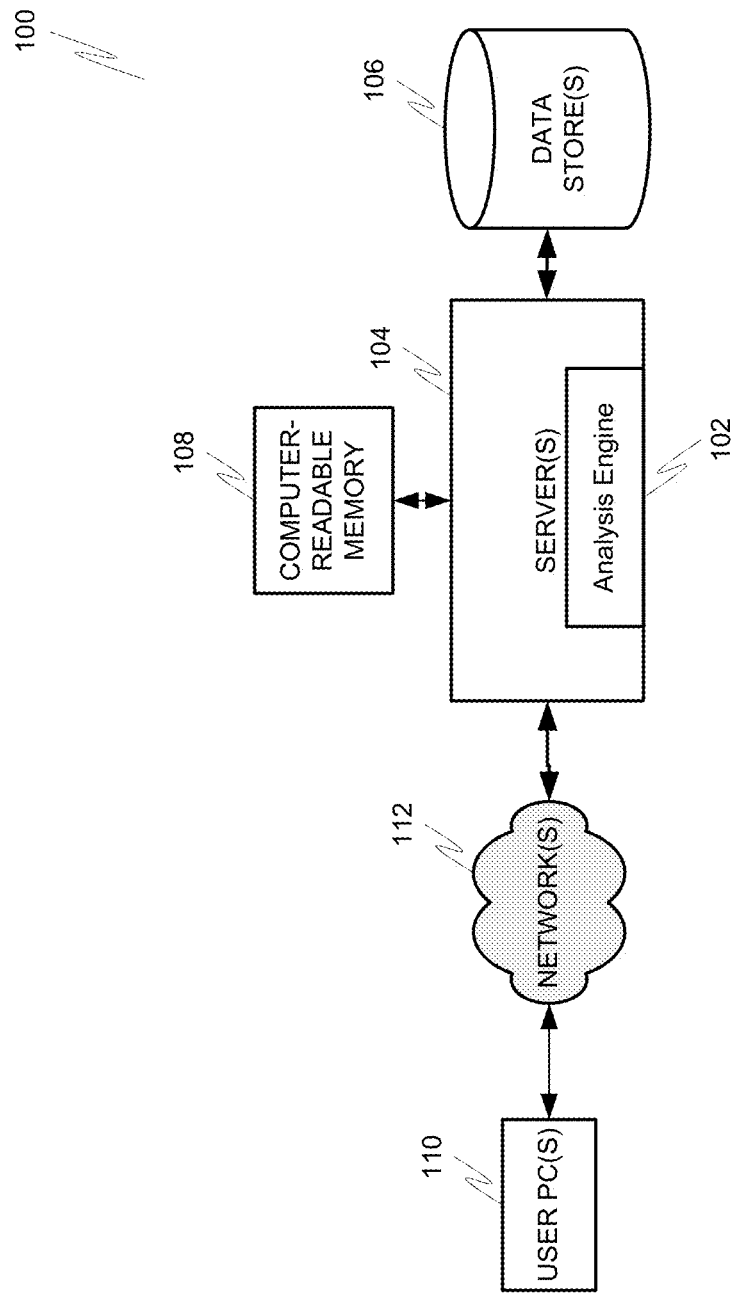
FIG. 1 is a block diagram of an example system for implementing sparse deterministic direct solvers such as Cholesky and $LDL^T$ without using locks.

Depicted in FIG. 1 is a block diagram of an example system 100 for implementing sparse deterministic direct solvers such as Cholesky and $LDL^T$ without using locks. The example system 100 includes an analysis engine 102 that is implemented in a computer system that may include one or more server computers 104. The analysis engine 102 has access to one or more data stores 106 that store data on which computations are performed. The analysis engine has access to computer-readable memory 108, which store programming instructions that when executed by one or more processors in the computer system allow for implementation of sparse deterministic direct solvers such as Cholesky and $LDL^T$ without using locks. In operation, users may access the direct solver system 100, for example, via user PC(s) 110 over one or more network(s) 112.

Figure 2:
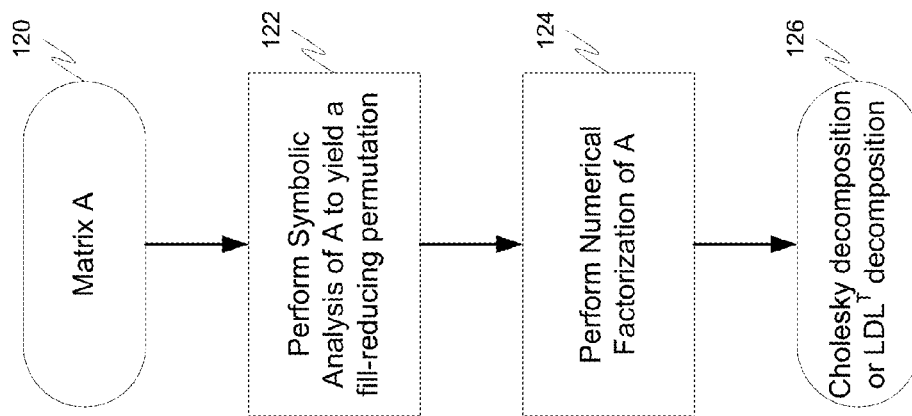
FIG. 2 is a flow diagram that depicts an example process that the direct solver system may implement to perform Cholesky or $LDL^T$ decomposition on a symmetric matrix A.

FIG. 2 depicts an example process that the direct solver system 100 may implement to perform Cholesky or $LDL^T$ decomposition on a symmetric matrix A. In this example process, factorization of a symmetric matrix A into either its Cholesky decomposition $A=LL^T$, when A is positive definite, or $LDL^T$ decomposition $A=LDL^T$, otherwise, is performed in two steps. During the $1^{st}$ step (step 122), the symbolic analysis of A is performed and a fill-reducing permutation is found. During the $2^{nd}$ step (step 124), the actual computations on the matrix A are performed to yield L (and D if $LDL^T$ factorization used).

In particular, at step 120, a symmetric matrix A is retrieved. At step 122, the symbolic analysis of matrix A is performed to yield a fill-reducing permutation. At step 124, a numerical factorization of matrix A is performed. This results in Cholesky or $LDL^T$ decomposition on a symmetric matrix A (step 126).

Figure 3:
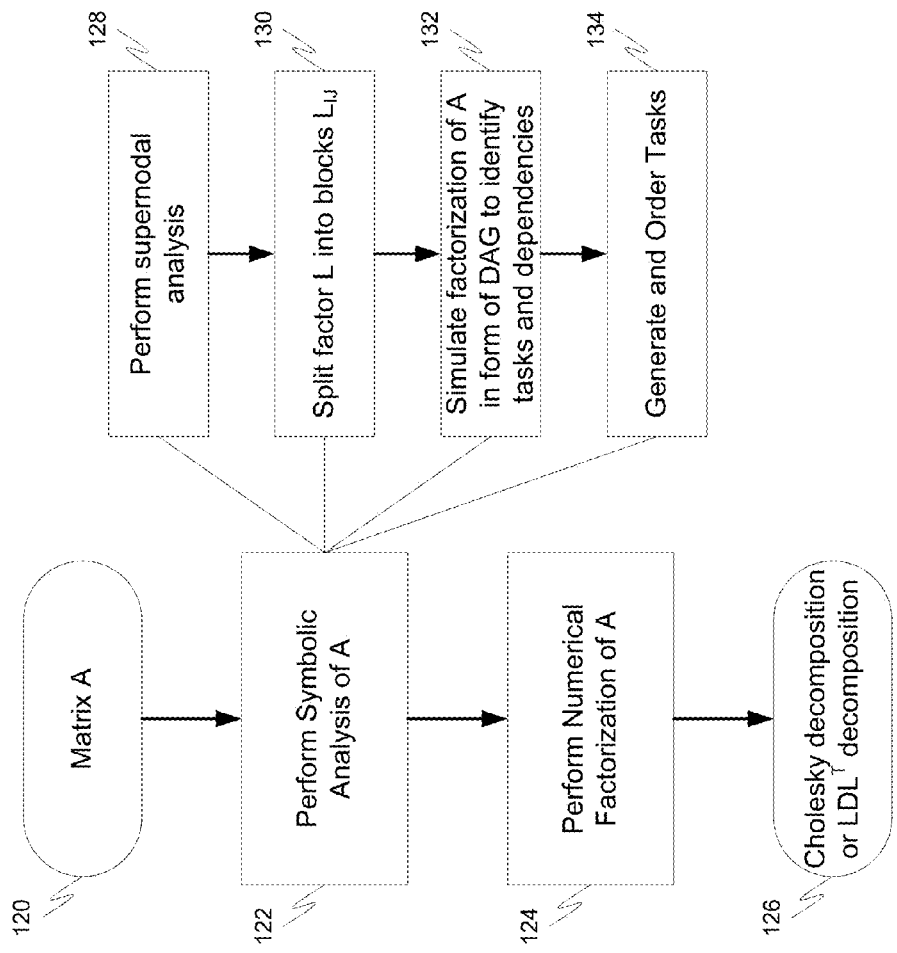
FIG. 3 is a flow diagram that illustrates example steps that may be performed during the symbolic analysis phase of the Cholesky or $LDL^T$ decomposition.

FIG. 3 illustrates example steps that are performed during the symbolic analysis phase of the Cholesky or $LDL^T$ decomposition. During this phase, the supernodal analysis of the factorization is performed (step 128). The factor L is then split, in a two-dimensional way, into blocks $L_{IJ}$, each of roughly the same size (step 130). The task of factorizing A is then simulated in the form of a Directed Acyclic Graph (DAG) (step 132) in which nodes represent tasks to be performed on blocks $L_{IJ}$, and edges represent dependencies between them. Each task represents a step in the actual numerical factorization of A. The tasks are categorized into 3 basic types: block $L_{JJ}$ factorization, denoted by Factor($L_{JJ}$), block solve for block $L_{IJ}$ using block $L_{JJ}$, denoted by Solve ($L_{IJ}, L_{JJ}$), and a block update of all affected blocks $L_{IK}$ from either the same or other supernodes using two blocks $L_{IJ}$ and $L_{KJ}$ from the same supernode, denoted by Update($L_{IJ}, L_{KJ}, L_{IK}$). The tasks are also provided with an order to allow the direct solver to be deterministic (step 134).

Figure 4:
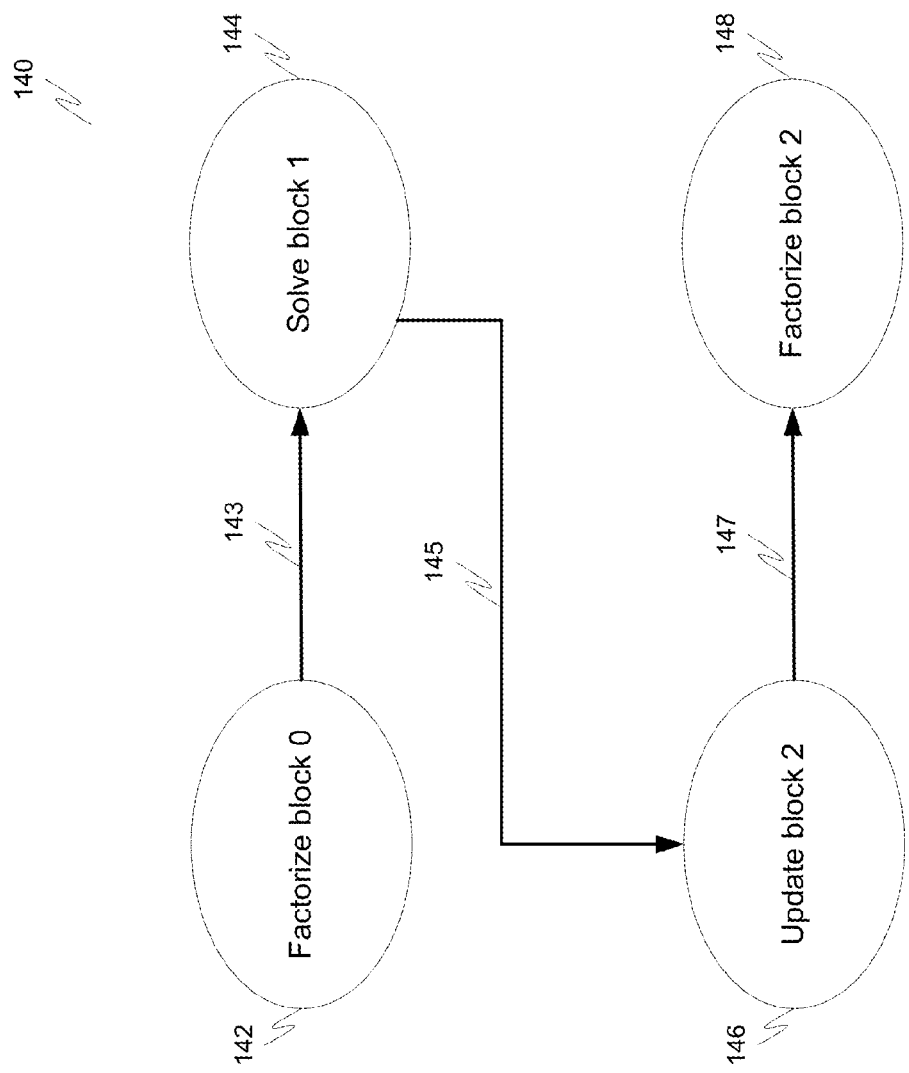
FIG. 4 is a block diagram of an example Directed Acyclic Graph ("DAG") for an example dense matrix that contains 3 blocks.

Depicted in FIG. 4 is an example DAG 140 for an example dense matrix that contains 3 supernodal blocks: block 0, block 1, and block 2. For this example matrix, four tasks must be performed to perform Cholesky or $LDL^T$ decomposition on the matrix: factorize block 0 (node 142), solve block 1 (node 144), update block 2 (node 146), and factorize block 2 (node 148). The edges between the nodes represent dependencies between the tasks. Edge 143 denotes that the solve block 1 task (144) is dependent on the factorize block 0 task (142). Edge 145 denotes that the update block 2 task (146) is dependent on the solve block 1 task (144). Edge 147 denotes that the factorize block 2 task (148) is dependent on the update block 2 task (146).

Figure 5:
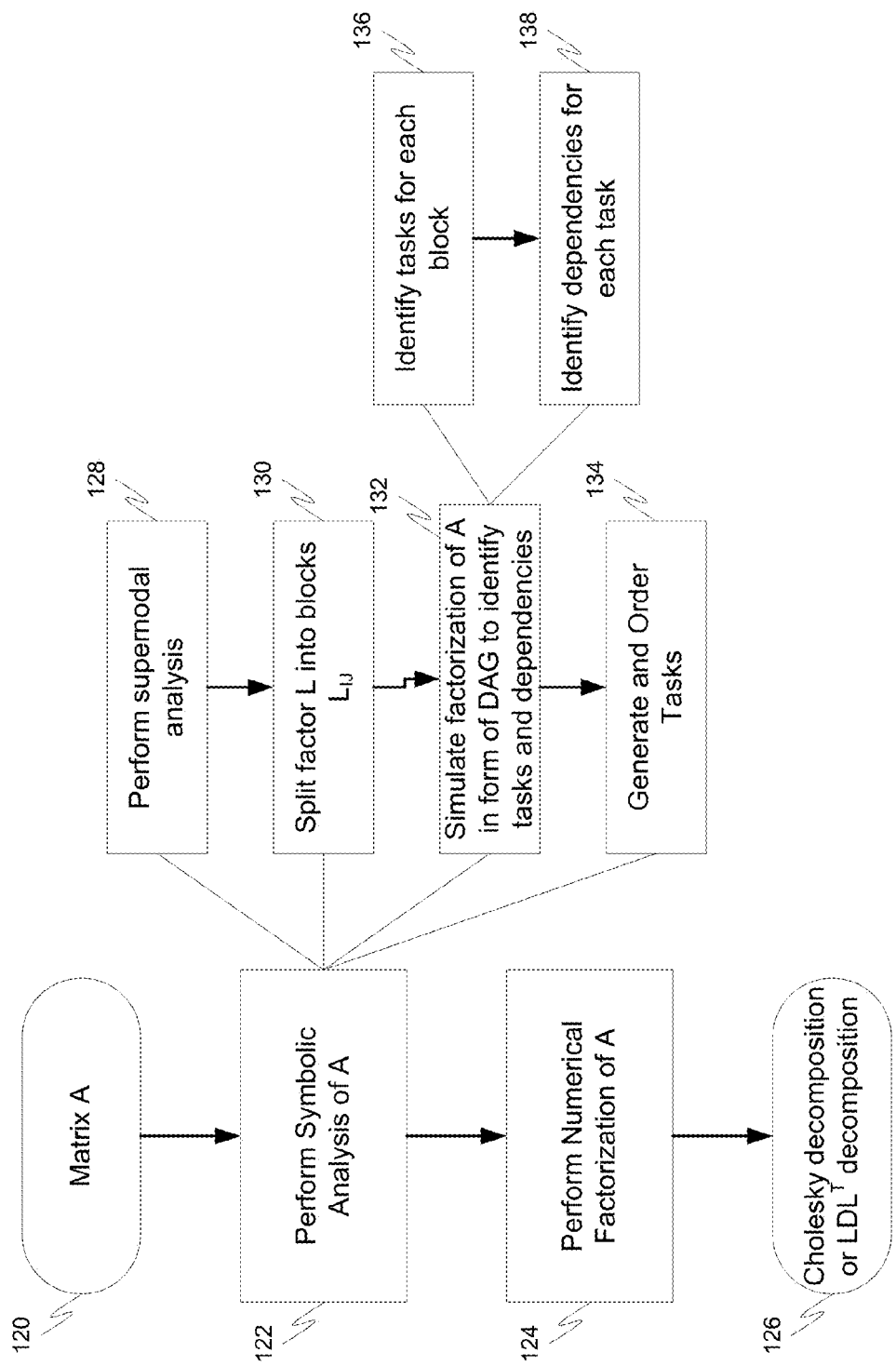
FIG. 5 is a flow diagram that depicts example steps that may be performed during the symbolic analysis phase of the Cholesky or $LDL^T$ decomposition based on a simulated DAG.

Depicted in FIG. 5 are example steps for identifying tasks and dependencies from the simulated DAG. The nodes of the simulated DAG identify tasks for each supernodal block (step 136). The edges of the simulated DAG identify dependencies for each task (step 138).

Figure 6:
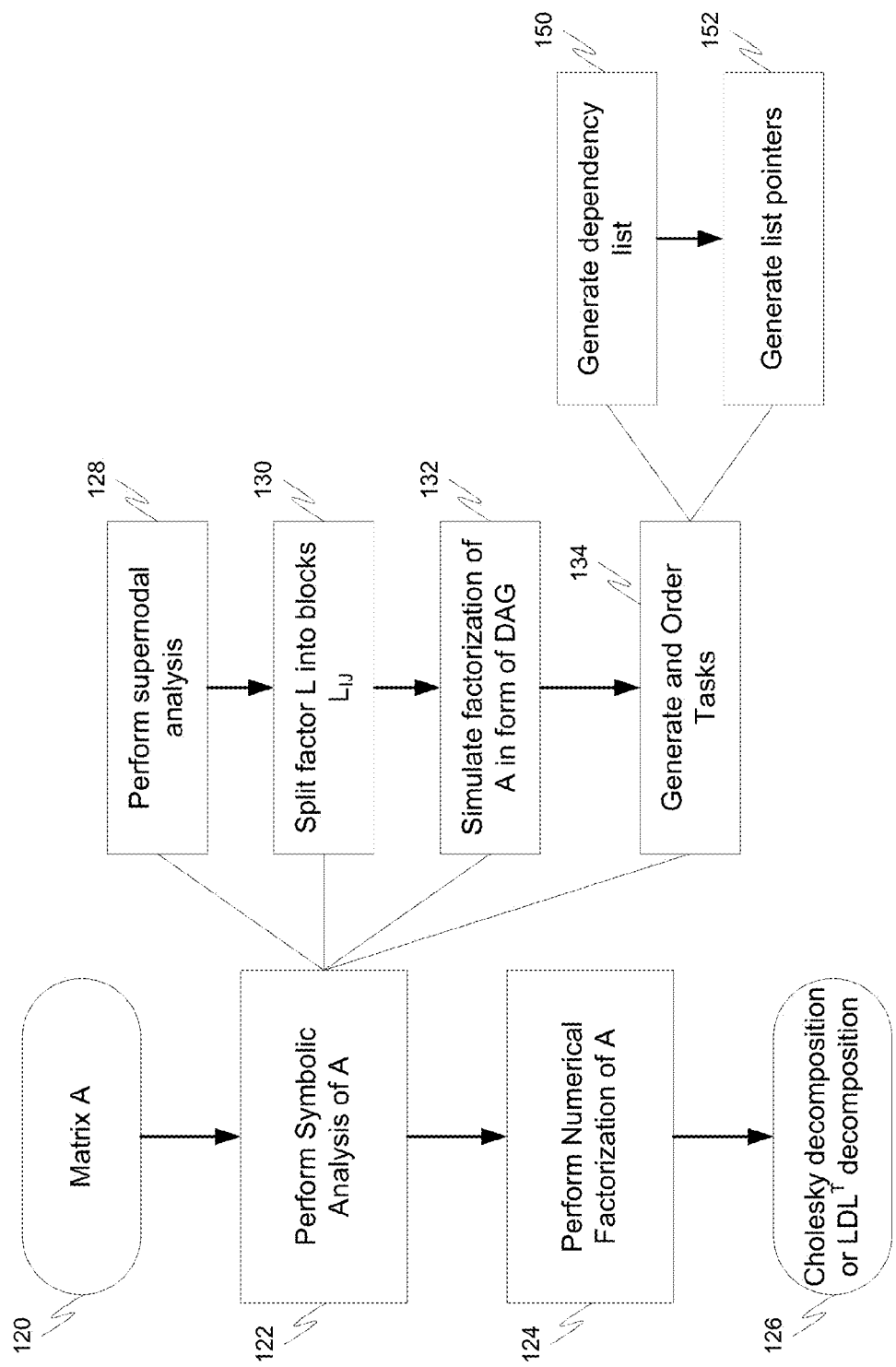
FIG. 6 is a flow diagram that depicts example steps used in ordering the tasks during the symbolic analysis phase.

Depicted in FIG. 6 are example steps used in ordering the tasks during the symbolic analysis phase. To perform a deterministic factorization, in the example process, tasks are assigned a specific order based on predetermined rules during symbolic analysis. The task order is recorded through the generation of a dependency list that may be stored in a data structure (step 150). A list pointer array may also generated (step 152) for use during the numerical phase to synchronize and keep track of the next scheduled update for each block $L_{IJ}$.

Specifically, for each block $L_{IJ}$ in the supernodal block partitioning, the list of tasks on which block $L_{IJ}$ depends is generated. This list is generated by reviewing all tasks that provide updates to the block $L_{IJ}$ and is retained in a data structure that contains similar lists for other blocks included in a factorization.

In these examples, levels are also used to help order tasks. Although the execution order for factor and solve tasks can be arbitrary as long as updates have been applied to them, the execution order for update tasks should be ordered. To order update tasks in this example, a number, referred to herein as a level, is associated with each update task. Since each update is of the form $L_{IJ}*L^T_{KJ}$ (or $L_{IJ}*(L_{KJ}*D_{JJ})^T$ in the $LDL^T$ case), the level is set to be the position of the block $L_{IJ}$ in the block array.

The levels are used in dependency lists to help order task execution. For each block $L_{IJ}$, all blocks that are updated by the $L_{IJ}$ block are determined and $L_{IJ}$'s level is added to the dependency list of each of those blocks that are updated by the $L_{IJ}$ block. Each block's dependency list is terminated with an empty level (e.g., −1), which is used to indicate that all the updates have been applied already and the block is ready to be factorized.

To synchronize updates, for each block $L_{IJ}$, the dependency list position is maintained, in the list pointer array, which will be used during the numerical phase to synchronize block updates. During the numerical phase, the list pointer will initially point to the location in the dependency list that contains the level of the first block that will update $L_{IJ}$. The list pointer will increment after each update is applied. When the dependency list pointer for $L_{IJ}$ reaches the last entry, $L_{IJ}$ is ready to be factorized.

To make the factorization run faster and to allow better thread synchronization, the status of each block $L_{IJ}$ may be maintained in a status array. The status array includes a location for each block wherein the latest block update level is recorded. The level stored in a block's status array location is equal to the level in the dependency list array pointed to by the dependency list pointer. When a block is ready to be factorized, its status is changed to −1 and after the factorization the block status is set to −2. In the example system, a single array is used to store the status of all blocks.

Levels may be assigned to solve and factorize tasks as well to convey DAG dependencies between them. In these examples, level assignment can be done by making the level of the task be simply the block position: $L_{JJ}$ for the factorize task and $L_{IJ}$ for the solve task.

Use of levels with solve and factorize tasks allows the level to also serve as an indicator of a thread's progress during the course of the actual factorization. During the numerical phase, each thread can maintain the level of the block involved in the task assigned to the thread and use that task level in the numerical phase to keep the task execution order in conformance with the task execution order determined during the symbolic analysis phase. The thread can also use the level for task fetching during numerical phase. At the start of the numerical phase, the thread unique id can be used as its initial level for the task assignment.

Figure 7:
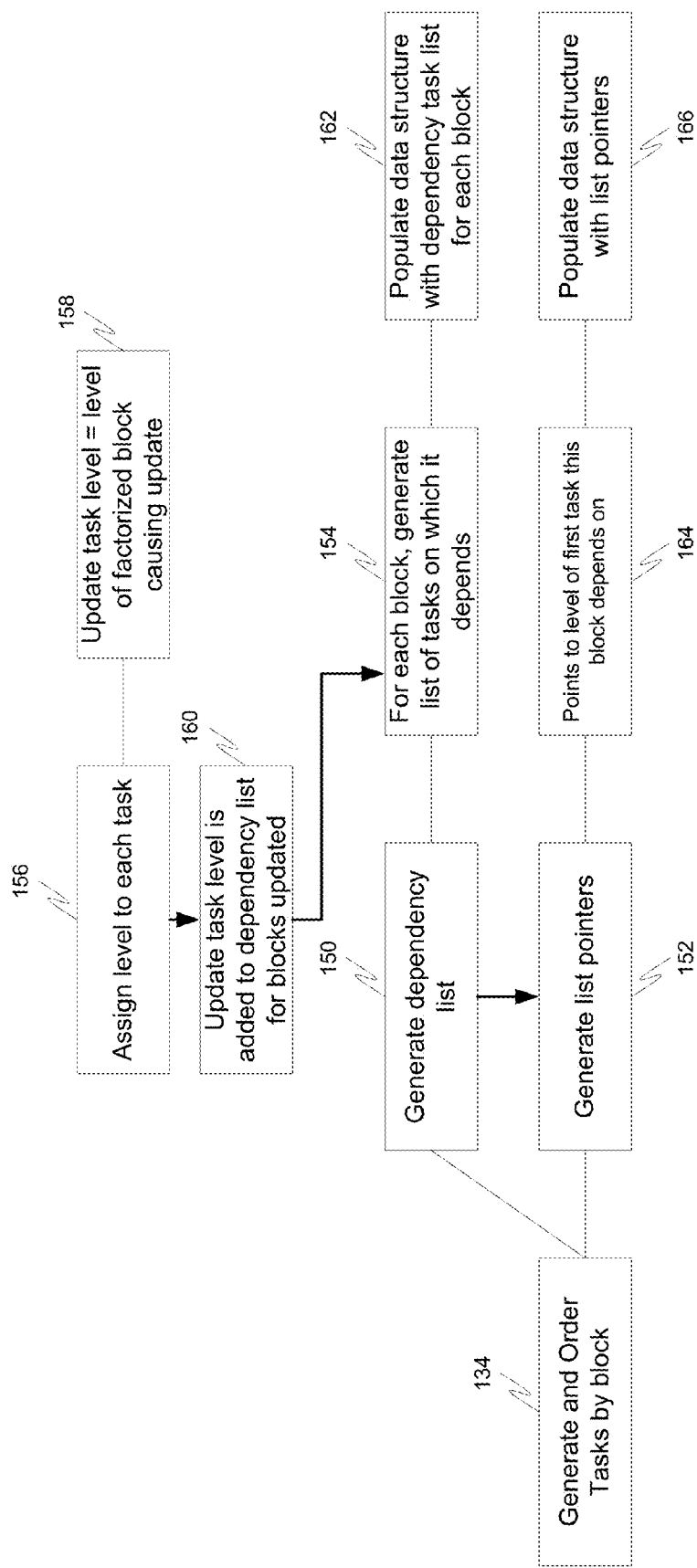
FIG. 7 is a flow diagram that depicts example steps that may be performed to generate a dependency list and to generate list pointers.

Depicted in FIG. 7 are example steps that may be performed to generate a dependency list and to generate list pointers. To generate the dependency list (step 150), for each block, the list of tasks on which the block is dependent is generated (step 154). A level is assigned to each task (step 156). The level assigned to an update task is the level of the factorizing block that causes the update (step 158). The update task level is added to the dependency list for each block that is updated by the update task (step 160). The resultant list of tasks for each block contains the levels that must be completed before the block can be factorized or solved. A data structure, e.g., a dependency list array, is populated with the dependency list for each block (step 162).

The list pointers generated at step 152, include a pointer for each block included in the factorization. Each pointer points to the level of the first task on which the particular block represented by that pointer depends (164). In particular, each pointer points to a specific location in the dependency list array associated with the particular block represented by that pointer. A data structure, e.g., a list pointer array, is populated with the list pointer value for each block (step 166).

Figure 8:
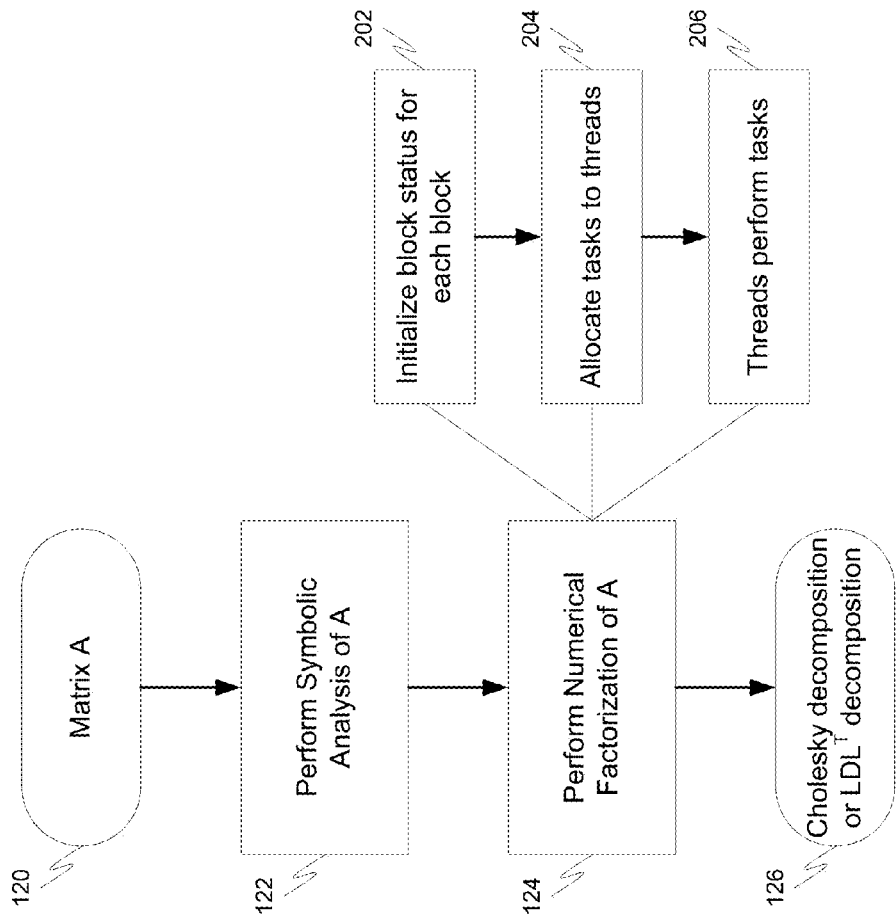
FIG. 8 is a flow diagram that depicts example steps for performing numerical factorization of matrix A.

Depicted in FIG. 8 are example steps for performing numerical factorization of matrix A. At step 202, the initial block status is set for each block. This block status is stored in the status array. At step 204, tasks are allocated to the threads wherein each thread is allocated a separate task. At step 206, each thread performs its assigned task when it is appropriate to do so.

During this numerical phase, each available thread is assigned a task according to a predefined scheduling mechanism. A number of thread scheduling strategies may be employed to create a linearized order of thread execution.

As an example, each thread may be assigned a task according to a predefined scheduling mechanism and current thread level. Each thread, based on its id number and the last worked on task level, can determine the next available task to be executed. This can be done, for example, by assigning the task involving the block whose level is 'numThreads' (wherein 'numThreads' is the number of threads used) away from the level of block involved in the previous task for this thread.

Since each update task is of the form $L_{IJ}*L^T_{KJ}$, for a fixed block $L_{IJ}$ all the update tasks with K<=I have the same level (equal to that of block $L_{IJ}$). Hence to accomplish deterministic ordering of tasks, a single thread can be designated to execute all updates $L_{IJ}*L^T_{KJ}$ for K<=I (and fixed $L_{IJ}$).

Figure 9:
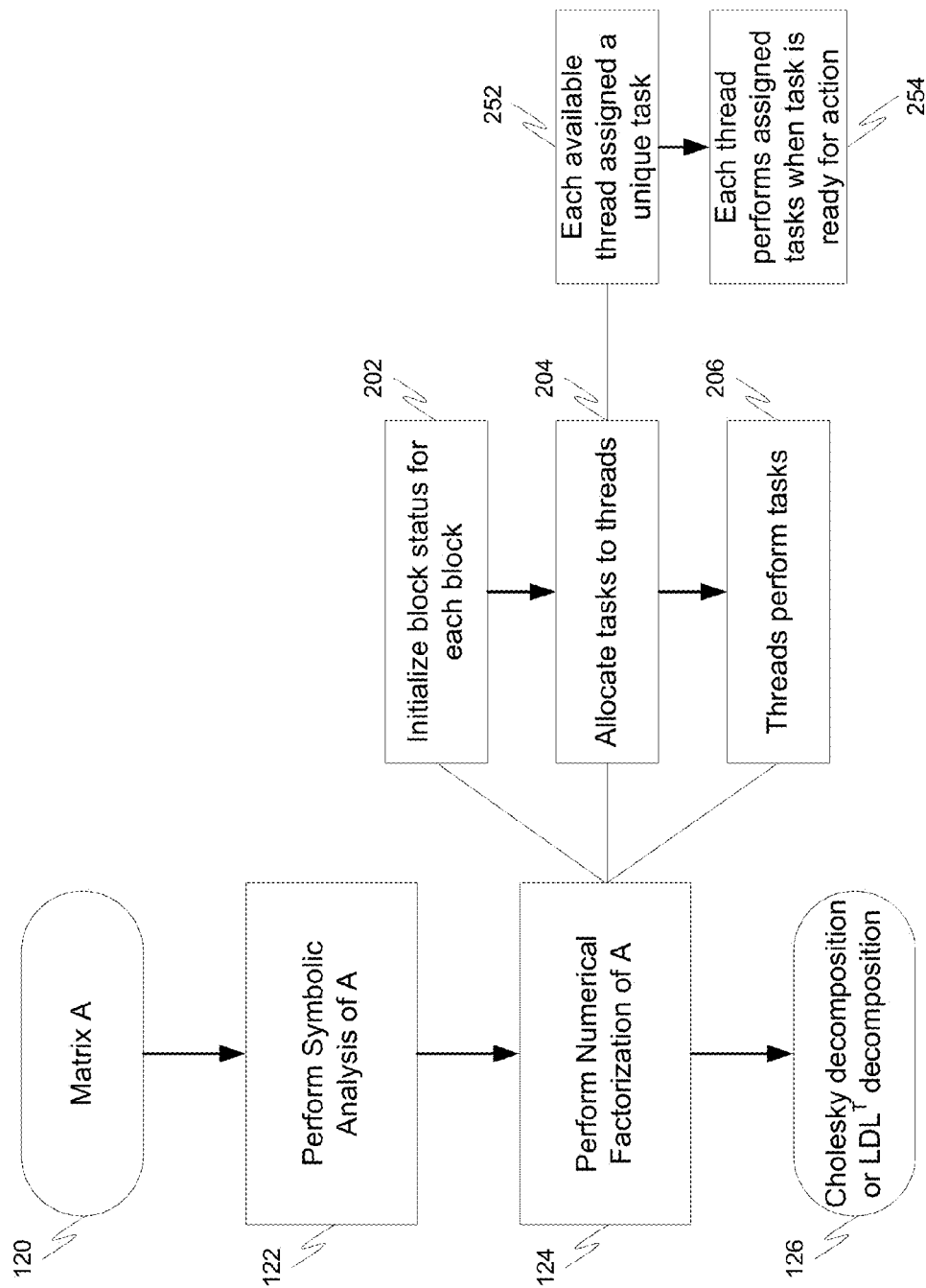
FIG. 9 is a flow diagram that illustrates an example process wherein multiple threads are assigned unique tasks during the numerical factorization phase.

FIG. 9 illustrates an example process wherein multiple threads are assigned unique tasks during the numerical factorization phase. At step 252, each available thread is assigned a unique task. At step 254, each thread performs its assigned task when the assigned task is ready for action.

Figure 10:
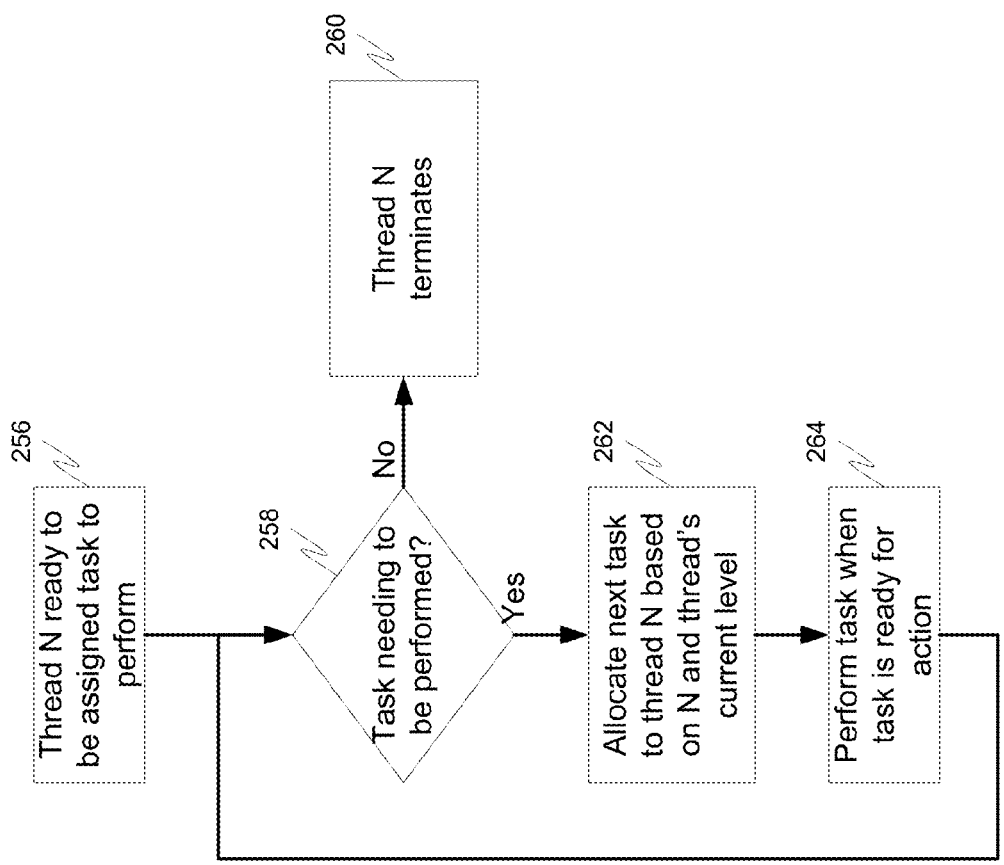
FIG. 10 is a flow diagram that depicts example steps for a thread to perform to request a new assigned task.

Depicted in FIG. 10 are example steps to be performed by a thread when seeking an assigned task to perform. At step 256, a thread N is ready to be assigned a task to perform. At step 258 a determination is made regarding whether a task exists that has not yet been assigned to a thread that needs to be performed. If no additional tasks exist, then the thread N terminates (step 260). If an additional task exists, at step 262, the next task is allocated to thread N based on N and the thread's current level. Then, at step 264, the thread performs the task when the task is ready for action. After the task is performed, the thread again checks to determine whether a task exists that has not yet been assigned to a thread that needs to be performed (step 258).

Figure 11:
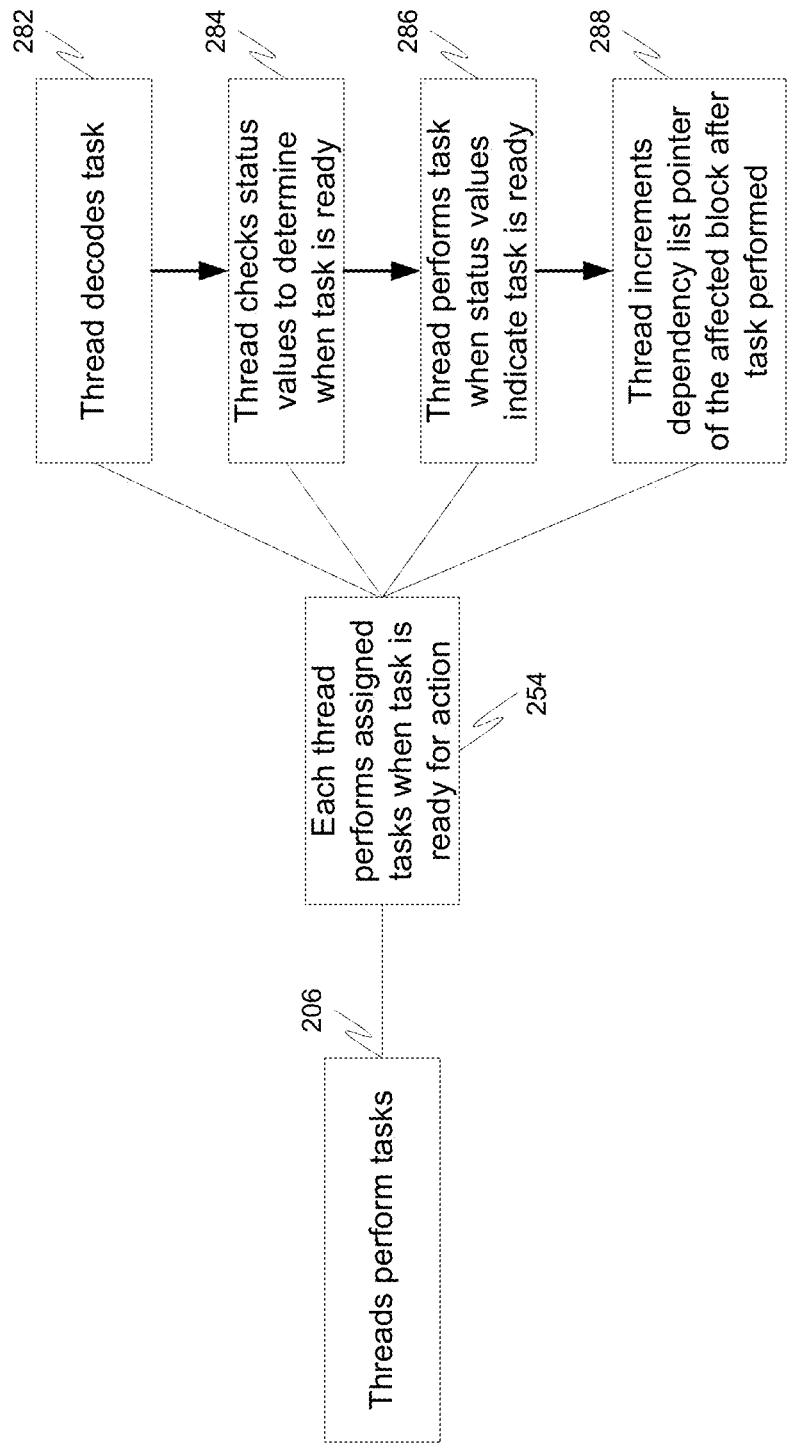
FIG. 11 is a flow diagram that depicts example steps executed by a thread to perform an assigned task.

Depicted in FIG. 11 are example steps executed by a thread to perform an assigned task. After a thread has been assigned a task, the task is then decoded (step 282). At step 284, the thread looks at the status value of the affected block and waits for the task to be ready, for example, by comparing the block's status to the thread level (since the block's status contains the level of the next scheduled for that block task). At step 286, the task is performed. After the task is completed and the block $L_{IJ}$ is updated, its dependency list pointer is incremented one position to point to the level of the next task affecting $L_{IJ}$ (step 288).

In this example, the status of each block can be accessed by several threads simultaneously. To accomplish this, the status array can be declared to be volatile and atomic operations can be used to access and modify it, thus avoiding explicit locking mechanism.

Figure 12:
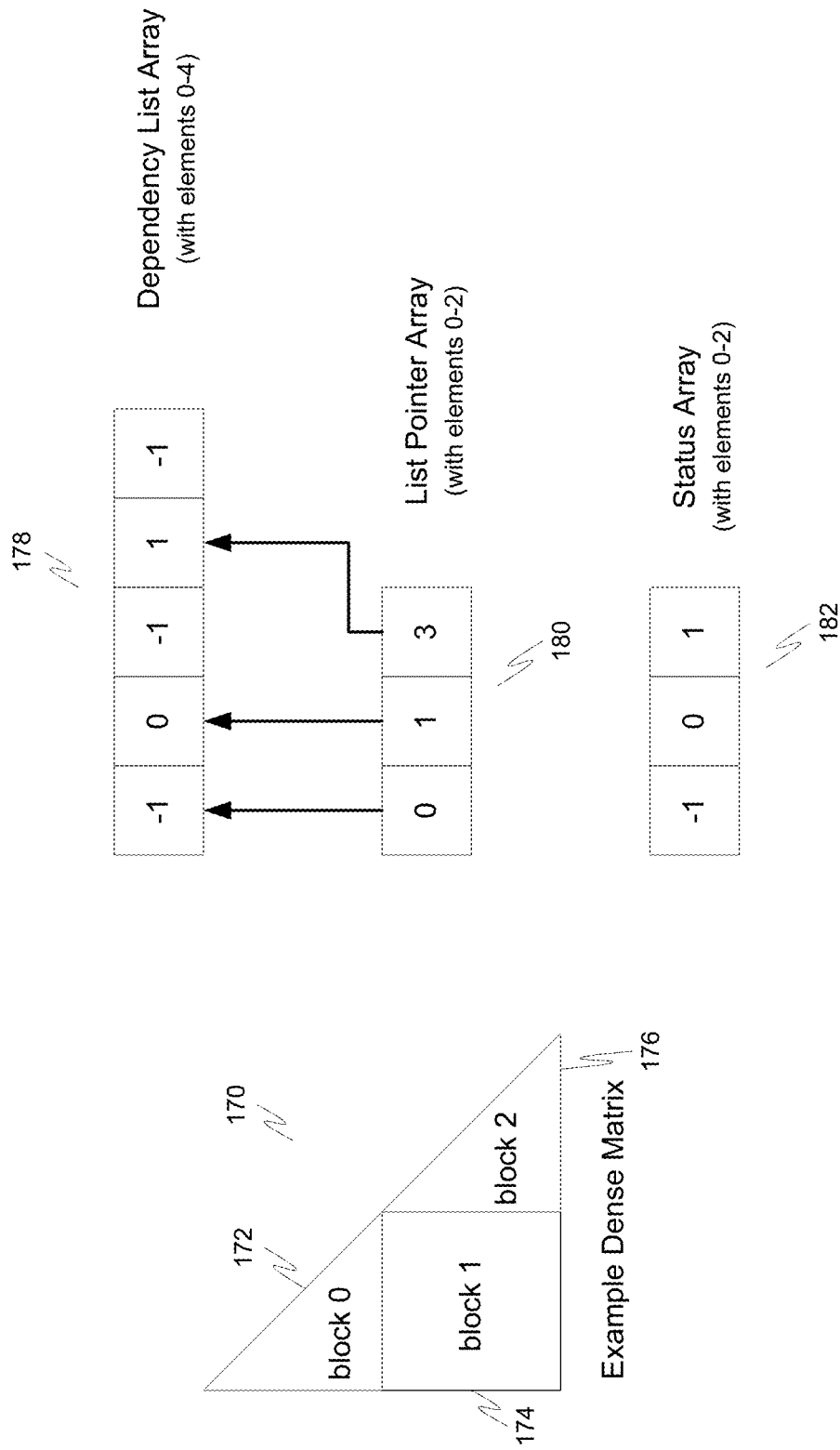
FIG. 12 is a block diagram that illustrates relationships between example blocks in a dense matrix and example data structures utilized by the example direct solver to order tasks in a deterministic Cholesky and $LDL^T$ direct solver.

Depicted in FIG. 12 is an example illustrating relationships between example blocks in a dense matrix and example data structures utilized by the example direct solver to order tasks in a deterministic Cholesky and $LDL^T$ direct solver. In this example, a dense matrix 170 having only one supernode in its L factor and whose block partitioning contains only 2 blocks in each direction is considered. The L factor can be represented using only 3 blocks (172, 174, and 176). Illustrated is a dependency list array 178 for all blocks, a list pointer array 180, and a status array 182. The list pointer array 180 and the status array 182 each have 3 elements since there are 3 blocks in the example dense matrix. Each pointer element in the list pointer array 180 points to a specific location in the dependency list array 178. Specifically, each pointer points to the level of the first task on which the particular block represented by that pointer depends. The contents of the dependency list array 178 consist of levels of tasks on which each block depends. The list pointer array 180 contains positions, within the dependency list array 178 of levels of the tasks on which each block currently depends. The arrows in the figure point to those positions. The initial contents of the status array 180 are values stored in the dependency list array 178 at positions pointed to by the list pointer.

In this example, tasks are dispatched to the threads based on block number and thread number so that thread 0 gets the task of factorizing block 0, thread 1 has the task of factorizing block 1, thread 2 has the task of updating block 2, and thread 3 has the task of factorizing block 2.

Since the block 0 part of dependency list array 178 has only an empty level, it has no dependencies and is ready to be factorized. After it has been factorized, its status is changed to factorized—status [0]=−2—and the List Pointer Array [0] is not used anymore. For block 1, its dependency list has status 0, meaning that its next dependency is on block 0. Hence it needs to wait on block 0 to be factorized. Let us denote by ATOMIC_ADD (a, b) the function that atomically adds value 'b' to a volatile pointer 'a' and returns the initial value of a, and let ATOMIC_SET (a, b) be a function that atomically sets value of 'a' to 'b'. Then an example mechanism for the block 1 to wait on block 0 can be described as follows:

```
while (ATOMIC_ADD (status [1], 0) != 0) ;    /* wait until block 1
                                                depends on block 0 */
while (ATOMIC_ADD (status [0], 0) != −2) ;   /* wait until block 0
                                                is factorized */
```

Assuming that thread 0 is done factorizing block 0, the second condition is satisfied and block 1 gets factorized by thread 1. Its status is then changed:

ATOMIC_SET(status[1],−2);/*mark block1 as factorized*/

The contents of the status array are then:

| −2 | −2 | 1 |

For thread 2 to update block 2 with block 1, it uses 'status [2]=1' to indicate dependency on block 1. Hence it waits on it to be factorized:

while(ATOMIC_ADD(status[1],0)!=−2);/*wait until block 1 is factorized*/ and also checks for block 2 to have its status equal to the level of block 1:

```
while (ATOMIC_ADD (status [2], 0) != 1) ;    /* wait until block 2
                                                depends on block 1 */
ATOMIC_SET (status [2], depList [++listPointer [2]]) ;    /* change
                                                             status of
                                                             block 2 */
```

After block 1 is factorized, thread 2 applies updates to block 2 and, using the list pointer array 180, changes the status of block 2 to equal the next entry in the dependency list array 178, which is −1.

Since the status of block 2 has been changed to −1, block 2 is ready for factorization and thread 3 proceeds with factorizing block 2.

Figure 13:
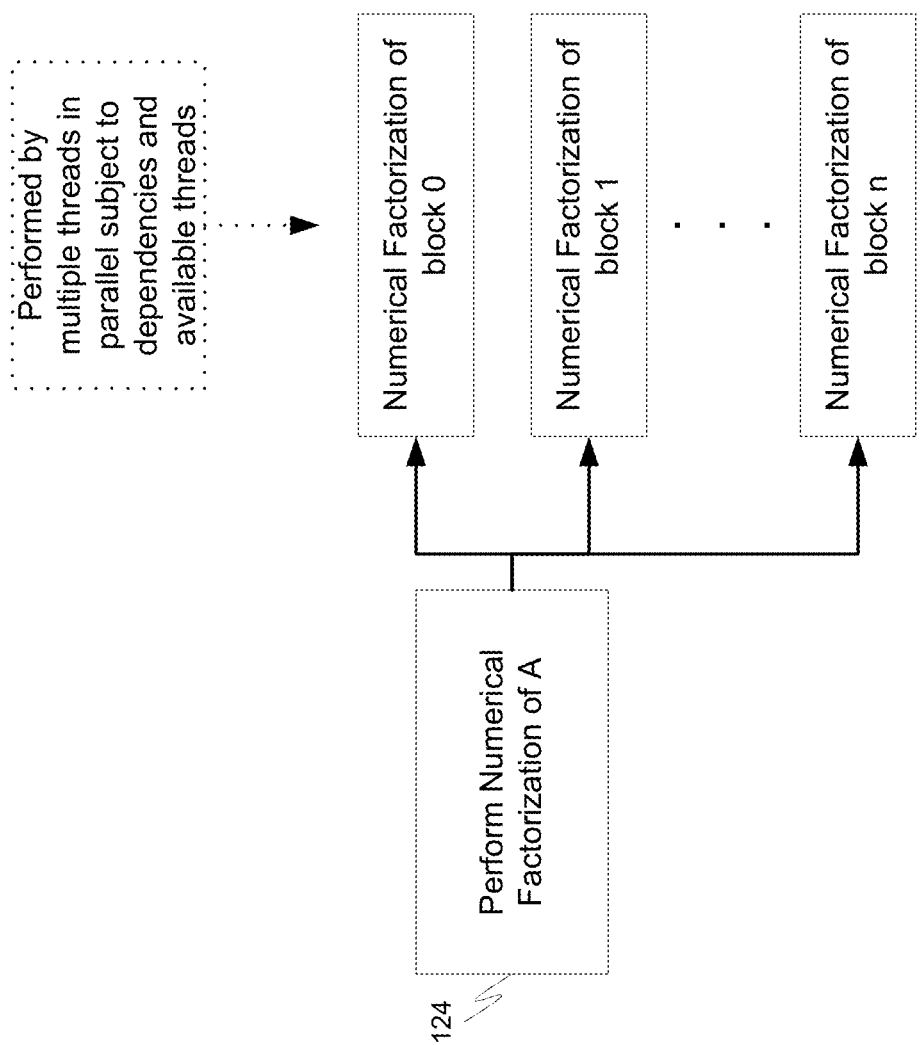
FIG. 13 is a flow diagram that depicts an example process wherein the numerical factorization of matrix A involves multiple threads performing update, factorization and solve tasks with respect to the various blocks.

FIG. 13 illustrates an example process wherein the numerical factorization of matrix A involves multiple threads performing update, factorization and solve tasks with respect to the various blocks. Each thread performs its assigned tasks after appropriate dependencies have been satisfied. The performance of the tasks results in the numerical factorization of each block.

Figure 14:
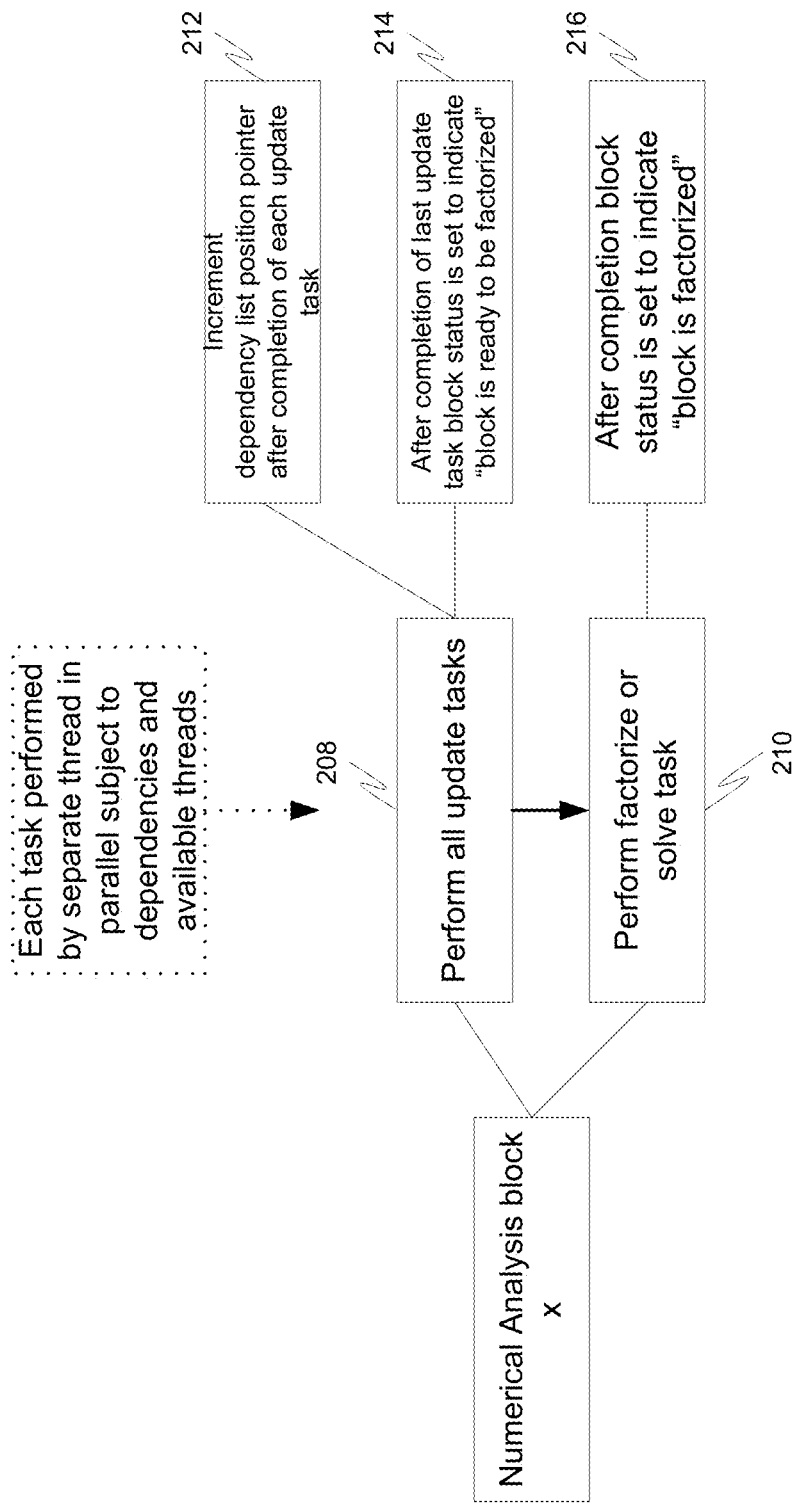
FIG. 14 is a flow diagram that depicts an example process, with respect to a particular block, wherein during the numerical phase, the update tasks are performed before factorize or solve tasks are performed.

FIG. 14 illustrates an example process, with respect to a particular block, wherein during the numerical phase, the update tasks (step 208) are performed before factorize or solve tasks (step 210) are performed. To track progress toward factorize or solve tasks being ready to be performed, the dependency list position pointer is incremented after each update task is completed (step 212). After the last update task is completed, the block status is set to indicate that the block is ready to be factorized (step 214). After a block factorize or solve task has been completed, the block status is updated to indicate that the block has been factorized.

Figure 15:
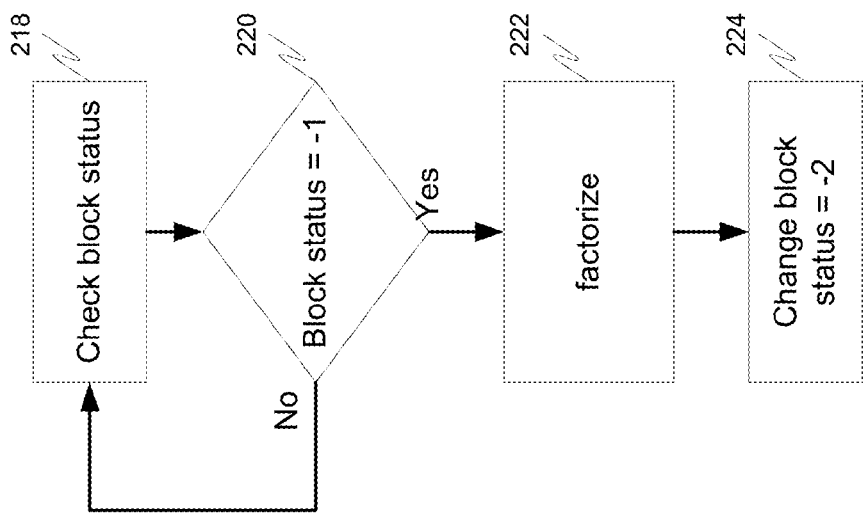
FIG. 15 is a flow diagram that depicts an example process for determining when a thread can perform a factorize task.
Figure 16:
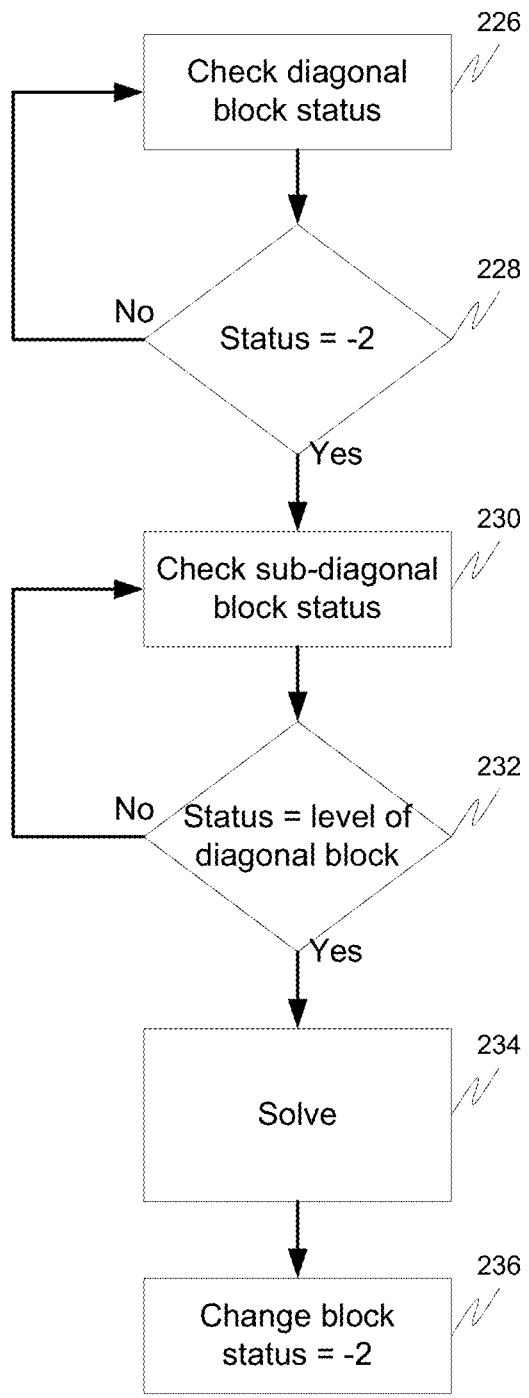
FIG. 16 is a flow diagrams that depicts an example process for determining when a thread can perform a solve task on a sub-diagonal block.
Figure 17:
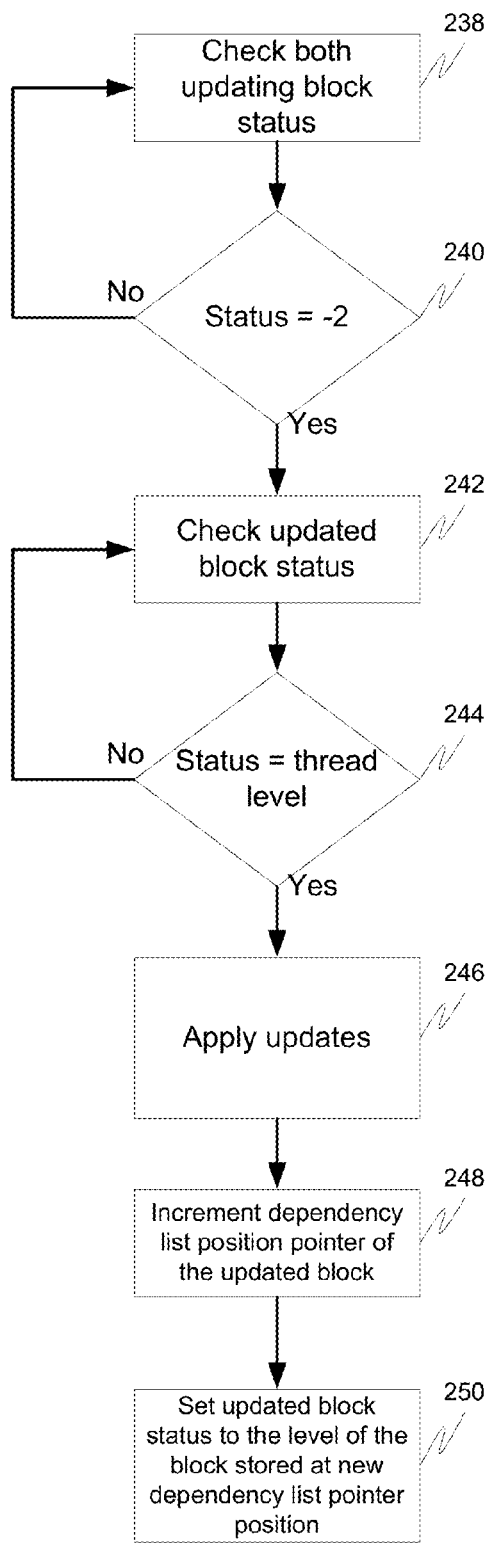
FIG. 17 is a flow diagram that depicts an example process for determining when a thread can perform an update task.

FIGS. 15-17, illustrate example steps that can be executed by threads for determining when to execute their assigned tasks. In these examples, the threads use the block status array to determine when to execute their assigned tasks. Depicted in FIG. 15 is an example process for determining when a factorize task can be performed. A particular thread that is assigned a factorize task checks the status of the block associated with the factorize task (step 218). At step 220, the thread determines if the block status indicates that the block is ready to be factorized, (status=−1 in this example). If the block status does not indicate that the block is ready to be factorized, the status is re-checked. If the block status indicates that the block is ready to be factorized, then at step 222 the thread factorizes the block. Finally, after the block has been factorized, the thread at step 224 changes the block status to indicate that the block has been factorized (status=−2 in this example).

Depicted in FIG. 16 is an example process for determining when a solve task can be performed on a sub-diagonal block. At step 226, a thread that is assigned a solve task checks the status of the diagonal block associated with the sub-diagonal block. At step 228, the thread determines if the block status indicates that the diagonal block has been factorized, (status=−2 in this example). If the block status does not indicate that the diagonal block has been factorized, the status is re-checked. If the block status indicates that the diagonal block has been factorized, then at step 230 the thread checks the sub-diagonal block status. At step 232, if the block status of the sub-diagonal block does not indicate that the sub-diagonal block is ready to be solved, the status is re-checked. If the block status indicates that the sub-diagonal block is ready to be solved (status=level of diagonal block in this example), then at step 234, the thread performs the solve task. After the solve task is completed, the thread at step 236 changes the sub-diagonal block status. Finally, after the block has been factorized, the thread at step 224 changes the block status to indicate that the block has been factorized (status=−2 in this example).

Depicted in FIG. 17 is an example process for determining when an update task can be performed. At step 238 a thread that is assigned an update task checks the status of the blocks that will cause the current block to update. At step 240, the thread determines if the block statuses of the updating blocks indicate that the blocks have been factorized, (status=−2 in this example). If the block statuses do not indicate that the blocks have been factorized, the statuses are re-checked. If the block statuses indicate that the updating blocks have been factorized, then at step 242 the thread checks the status of the updated block. If the status of the updated block indicates that the updated block is ready for updates (status=thread level in this example) then at step 246 the thread applies the updates to the updated block. Otherwise, the status of the updated block is re-checked until the status indicates that the block is ready for updates. After the updates are applied, the thread causes the dependency list position pointer of the updated block to be incremented (step 248). Finally, the thread at step 250 sets the updated block status to the level of the block stored at the new dependency list pointer position.

Figure 18:
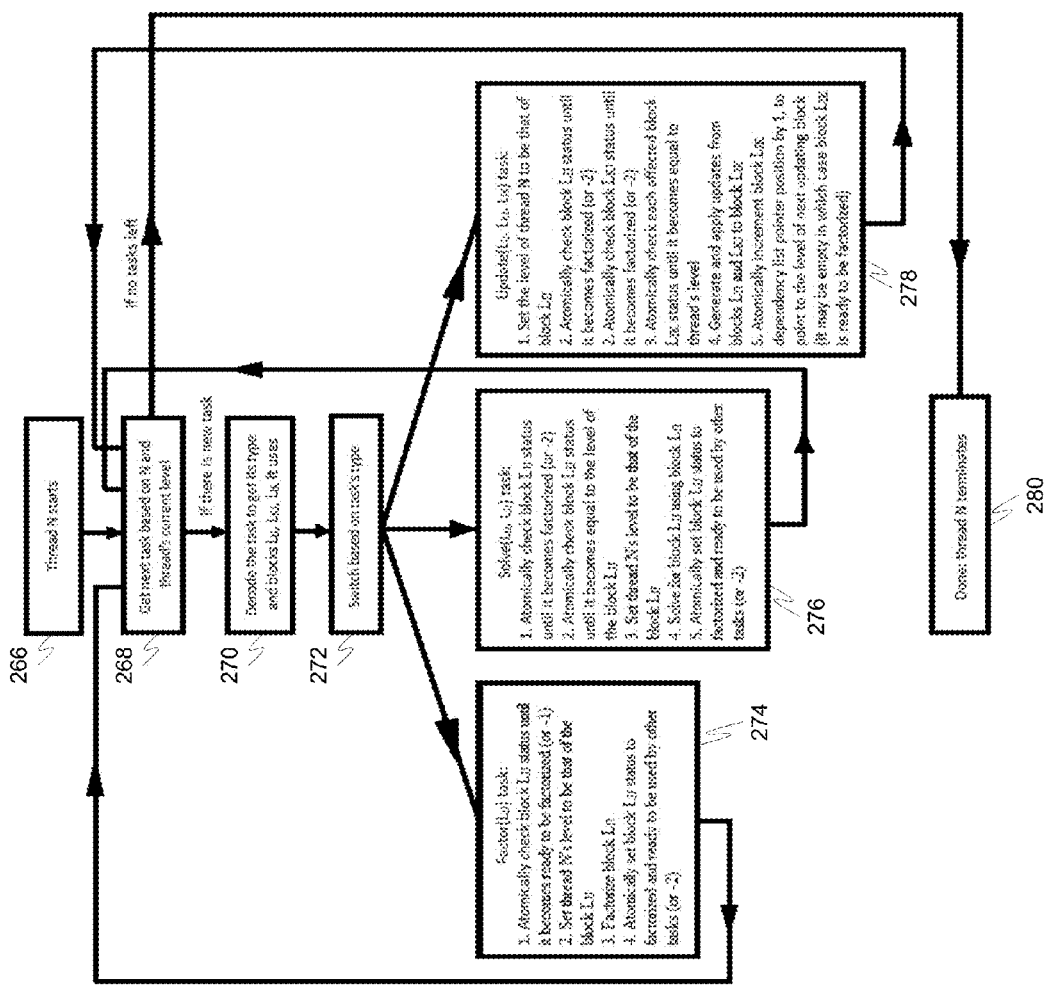
FIG. 18 is a flow diagram that depicts example steps for performing numerical factorization of matrix A

Depicted in FIG. 18 are example steps performed by threads during the numerical factorization of matrix A. Each thread starts at step 266. At step 268, thread N attempts to get the next task based on N and the thread's current level. If there is a new task that has not been assigned to a thread, thread N decodes the task to get its type and blocks $L_{JJ}$, $L_{KJ}$ and $L_{IK}$ used in performing the task (step 270). At step 272, a determination is made as to the task type: factor task, solve task, or update task. If the task is a factor task, then step 274 is implemented. If the task is a solve task, then step 276 is implemented. If the task is an update task then step 278 is implemented. After the task is performed, the process returns to step 268 wherein thread N attempts to get the next task. If no tasks are left, the thread is done and terminates (step 280).

In the example process of FIG. 18, each task type results in the performance of a plurality of steps. For a factor task type (274), thread N performs the following steps. First the thread atomically checks block $L_{JJ}$ status until it becomes ready to be factorized. Then, the thread sets its level to be that of block $L_{JJ}$. Next, the thread factorizes block $L_{JJ}$. Finally, the thread atomically sets block $L_{JJ}$ status to factorized and ready to be used by other tasks.

For a solve task type (276), thread N performs the following steps. First the thread atomically checks block $L_{JJ}$ status until it becomes factorized. Then, the thread atomically checks block $L_{IJ}$ status until it becomes equal to the level of block $L_{JJ}$. Next, thread N's level is set to be that of block $L_{JJ}$. Then, the thread performs the solve task for block $L_{IJ}$ using block $L_{JJ}$. Finally, the thread atomically sets block $L_{IJ}$ status to factorized and ready to be used by other tasks.

For an update task type (278), thread N performs the following steps. The level of thread N is set to be that of block $L_{JJ}$. The thread atomically checks block $L_{IJ}$ status until it becomes factorized. The thread then atomically checks block $L_{KJ}$ status until it becomes factorized. Next, the thread atomically checks each affected block $L_{IK}$ status until it becomes equal to the thread's level. Then, the thread generates and applies updates from blocks $L_{JJ}$ and $L_{KJ}$ to block $L_{IK}$. Finally, the thread atomically increments block $L_{IK}$ dependency list pointer position by 1, to point to the level of next updating block. If the next updating block is empty, then $L_{IK}$ is ready to be factorized.

Figure 19A:
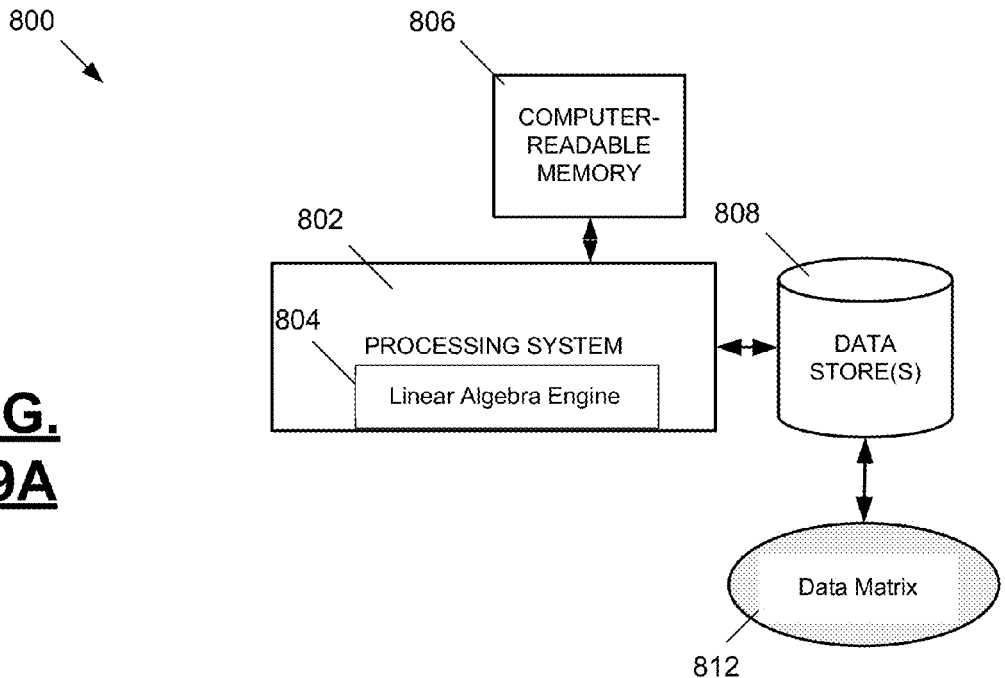
FIGS. 19A, 19B, and 20 depict examples of systems that may be used to implement a sparse deterministic direct solver.
Figure 19B:
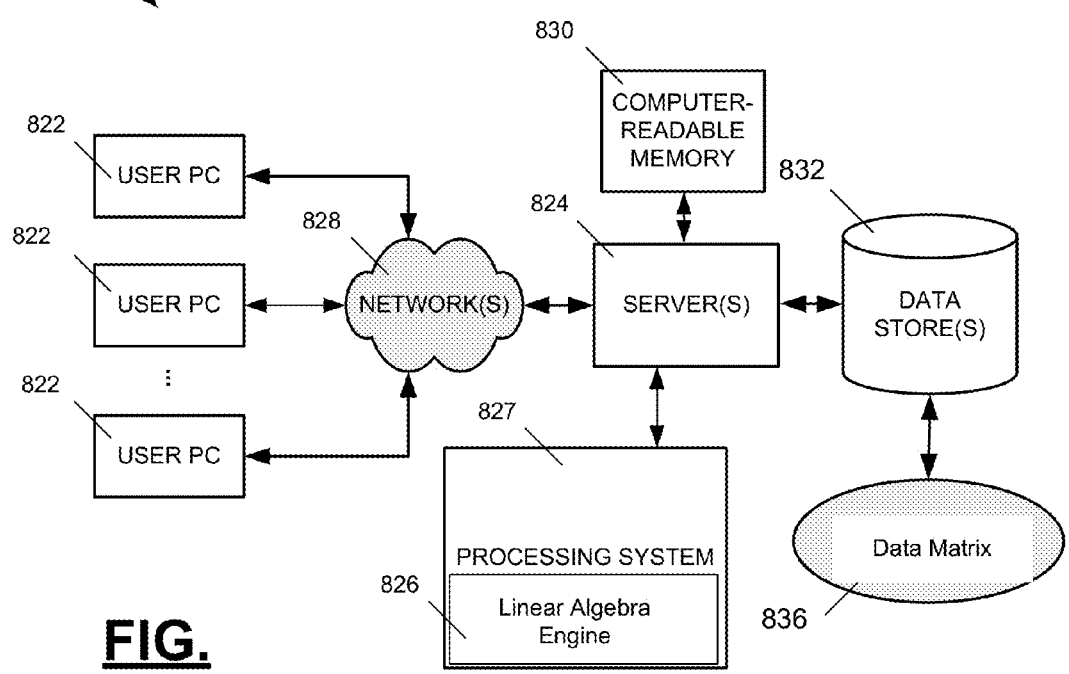

FIGS. 19A and 19B depict examples of systems that may be used to perform factorization. For example, FIG. 19A depicts an example of a system 800 that includes a standalone computer architecture where a processing system 802 (e.g., one or more computer processors) includes a linear algebra engine 804 being executed on it. The processing system 802 has access to a computer-readable memory 806 in addition to one or more data stores 808. The one or more data stores 808 may include data matrices 812 upon which the matrix factorization operations are to be performed.

FIG. 19B depicts a system 820 that includes a client server architecture. One or more user PCs 822 access one or more servers 824 running a linear algebra engine 826 on a processing system 827 via one or more networks 828. The one or more servers 824 may access a computer readable memory 830 as well as one or more data stores 832. The one or more data stores 832 may contain data matrices 836 upon which the matrix factorization operations are to be performed.

Figure 20:
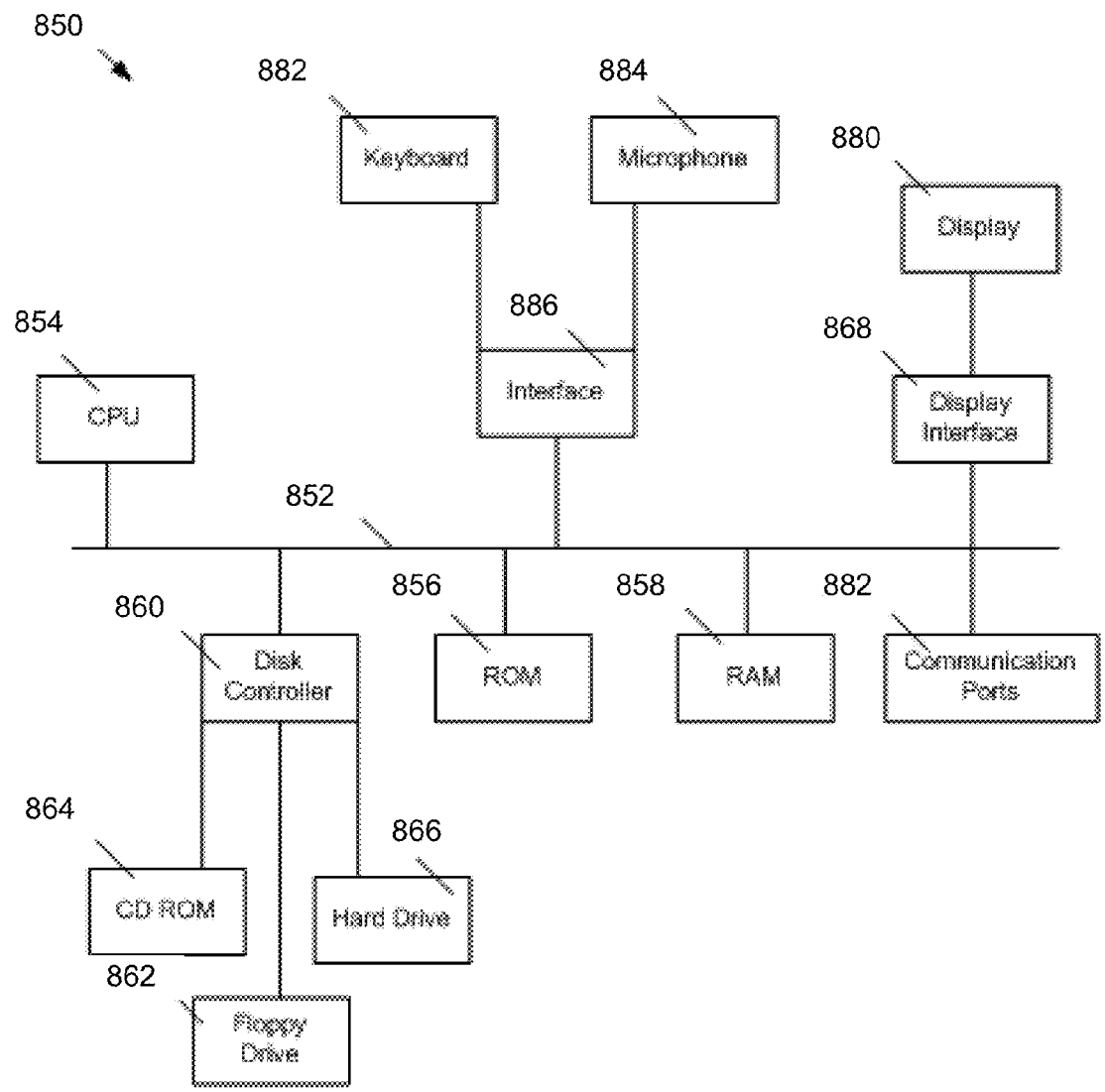

FIG. 20 shows a block diagram of an example of hardware for a standalone computer architecture 850, such as the architecture depicted in FIG. 19A that may be used to contain and/or implement the program instructions of system embodiments of the present invention. A bus 852 may connect the other illustrated components of the hardware. A processing system 854 labeled CPU (central processing unit) (e.g., one or more computer processors), may perform calculations and logic operations required to execute a program. A processor-readable storage medium, such as read only memory (ROM) 856 and random access memory (RAM) 858, may be in communication with the processing system 854 and may contain one or more programming instructions for performing an index join operation. Optionally, program instructions may be stored on a computer readable storage medium such as a magnetic disk, optical disk, recordable memory device, flash memory, or other physical storage medium. Computer instructions may also be communicated via a communications signal, or a modulated carrier wave.

A disk controller 860 interfaces one or more optional disk drives to the system bus 852. These disk drives may be external or internal floppy disk drives such as 862, external or internal CD-ROM, CD-R, CD-RW or DVD drives such as 864, or external or internal hard drives 866. As indicated previously, these various disk drives and disk controllers are optional devices.

Each of the element managers, real-time data buffer, conveyors, file input processor, database index shared access memory loader, reference data buffer and data managers may include a software application stored in one or more of the disk drives connected to the disk controller 860, the ROM 856 and/or the RAM 858. Preferably, the processor 854 may access each component as required.

A display interface 868 may permit information from the bus 852 to be displayed on a display 870 in audio, graphic, or alphanumeric format. Communication with external devices may optionally occur using various communication ports 872.

In addition to the standard computer-type components, the hardware may also include data input devices, such as a keyboard 873, or other input device 874, such as a microphone, remote control, pointer, mouse and/or joystick.

This written description uses examples to disclose the invention, including the best mode, and also to enable a person skilled in the art to make and use the invention. The patentable scope of the invention may include other examples. Additionally, the methods and systems described herein may be implemented on many different types of processing devices by program code comprising program instructions that are executable by the device processing subsystem. The software program instructions may include source code, object code, machine code, or any other stored data that is operable to cause a processing system to perform the methods and operations described herein. Other implementations may also be used, however, such as firmware or even appropriately designed hardware configured to carry out the methods and systems described herein.

The systems' and methods' data (e.g., associations, mappings, data input, data output, intermediate data results, final data results, etc.) may be stored and implemented in one or more different types of computer-implemented data stores, such as different types of storage devices and programming constructs (e.g., RAM, ROM, Flash memory, flat files, databases, programming data structures, programming variables, IF-THEN (or similar type) statement constructs, etc.). It is noted that data structures describe formats for use in organizing and storing data in databases, programs, memory, or other computer-readable media for use by a computer program.

The computer components, software modules, functions, data stores and data structures described herein may be connected directly or indirectly to each other in order to allow the flow of data needed for their operations. It is also noted that a module or processor includes but is not limited to a unit of code that performs a software operation, and can be implemented for example as a subroutine unit of code, or as a software function unit of code, or as an object (as in an object-oriented paradigm), or as an applet, or in a computer script language, or as another type of computer code. The software components and/or functionality may be located on a single computer or distributed across multiple computers depending upon the situation at hand.It should be understood that as used in the description herein and throughout the claims that follow, the meaning of "a," "an," and "the" includes plural reference unless the context clearly dictates otherwise. Also, as used in the description herein and throughout the claims that follow, the meaning of "in" includes "in" and "on" unless the context clearly dictates otherwise. Finally, as used in the description herein and throughout the claims that follow, the meanings of "and" and "or" include both the conjunctive and disjunctive and may be used interchangeably unless the context expressly dictates otherwise; the phrase "exclusive or" may be used to indicate situation where only the disjunctive meaning may apply.

It is claimed:

1. A processor-implemented method for implementing a sparse deterministic direct solver on a symmetric matrix without using locks, comprising:
    analyzing a symmetric matrix by defining a plurality of dense blocks;
    identifying at least one task for each of the dense blocks;
    assigning a level to each of the tasks identified for each of the dense blocks, wherein a level represents a scheduled execution order for a task;
    assigning a level to each of a plurality of threads to indicate a progress of each thread through factorization;
    storing, in a first data structure, a dependency list for each of the dense blocks, wherein a dependency list includes levels of tasks that update a dense block;
    storing, in a second data structure, a status for each of the dense blocks, wherein a stored status includes a level of a next task to update for the dense block associated with the status, and wherein the stored status is changeable by one or more threads;
    assigning a plurality of the tasks to the plurality of threads, wherein each thread is assigned a unique task, and wherein each of the plurality of threads executes an assigned task when the status of the dense block that the assigned task updates matches the level of the thread executing the task; and
    executing the tasks assigned to the threads,
    wherein, when a task is completed, the status of the updated dense block is updated according to a type of the task completed.

2. The method of claim 1, wherein the second data structure is volatile.

3. The method of claim 1, wherein the statuses for each of the dense blocks can be atomically changed.

4. The method of claim 1, wherein a task is either a factor task, a solve task, or an update task and wherein a factor task involves factorizing a dense block, a solve task involves solving for one dense block using another dense block, and an update task involves generating and applying updates from two dense blocks to a third dense block.

5. The method of claim 4, wherein after a factor task is executed, a status of a dense block is updated to indicate that the corresponding block is factorized and ready to be used by other tasks.

6. The method of claim 4, wherein after a solve task is executed, a status of a dense block is updated to indicate that the corresponding block is factorized and ready to be used by other tasks.

7. The method of claim 4, wherein after an update task is executed, a status of a dense block is updated to indicate that the corresponding block is ready to be factorized.

8. The method of claim 1, wherein after completing their assigned tasks, the plurality of threads are assigned new tasks.

9. The method of claim 1, wherein two or more tasks are executed by a same thread when the two or more tasks are assigned a same level.

10. The method of claim 1, further comprising utilizing a dependency list pointer associated with each dependency list,
wherein the dependency list pointer points a thread to an initial task to be executed within its associated dependency list, and
wherein the dependency list pointer increments after the thread executes the initial task.

11. The method of claim 1, further comprising:
determining whether two or more tasks are assigned to a same level; and
upon determining that two or more tasks are assigned to the same level, executing the two or more tasks by a same thread.

12. The method of claim 1, further comprising utilizing a dependency list pointer associated with each dense block dependency list,
wherein a dependency list pointer includes a location in a dependency list of the level of the next task to be executed by a thread.

13. The method of claim 12, further comprising:
incrementing the dependency list pointer by one after the task execution.

14. The method of claim 1, wherein the status of a dense block is changed to −1 to indicate that a dense block has all tasks applied to the dense block and is ready to be factorized once a last task associated with a dense block has been executed.

15. The method of claim 1, wherein each thread is assigned a unique level based on a thread logical identifier (ID) and increments the unique level after each task completion by a same amount in order to keep unique task fetching based on a current thread level.

16. The method of claim 1, wherein each thread has a status, and wherein the status of each thread differs from the status of a dense block.

17. The method of claim 1, wherein the type of a task comprises a factor task, a solve task, or an update task.

18. A computer-implemented sparse deterministic direct solver system for performing linear algebraic computations on a matrix, comprising:
one or more data processors;
a computer-readable storage medium encoded with instructions for commanding the one or more data processors to execute operations including:
analyzing a symmetric matrix by defining a plurality of dense blocks;
identifying at least one task for each of the dense blocks;
identifying, for each task, any operations on which the task is dependent;
assigning a level to each of the tasks identified for each of the dense blocks, wherein a level represents a scheduled execution order for a task;
assigning a level to each of a plurality of threads to indicate a progress of each thread through factorization;
storing, in a first data structure, a dependency list for each of the dense blocks, wherein a dependency list includes levels of tasks that update a dense block;
storing, in a second data structure, a status for each of the dense blocks, wherein a stored status includes a level of a next task to update for the dense block associated with the status, and wherein the stored status is changeable by one or more threads;
assigning a plurality of the tasks to the plurality of threads, wherein each thread is assigned a unique task, and wherein each of the plurality of threads executes an assigned task when the status of the dense block that the assigned task updates matches the level of the thread executing the task;
executing the tasks assigned to the threads,
wherein, when a task is completed, the status of the updated dense block is updated according to a type of the task completed.

19. The direct solver system of claim 18 wherein the second data structure is volatile.

20. The direct solver system of claim 18 wherein the statuses for each of the dense blocks can be atomically changed.

21. The direct solver system of claim 18 wherein a task is either a factor task, a solve task, or an update task and wherein a factor task involves factorizing a dense block, a solve task involves solving for one dense block using another dense block, and an update task involves generating and applying updates from two dense blocks to a third dense block.

22. The direct solver system of claim 21 wherein after a factor task is executed, a status of a dense block is updated to indicate that the corresponding block is factorized and ready to be used by other tasks.

23. The direct solver system of claim 21 wherein after a solve task is executed, a status of a dense block is updated to indicate that the corresponding block is factorized and ready to be used by other tasks.

24. The direct solver system of claim 21 wherein after an update task is executed, a status of a dense block is updated to indicate that the corresponding block is ready to be factorized.

25. The direct solver system of claim 18 wherein after completing their assigned tasks, the plurality of threads are assigned new tasks.

26. The direct solver system of claim 18, wherein two or more tasks are executed by a same thread when the two or more tasks are assigned a same level.

27. The direct solver system of claim 18, further comprising a dependency list pointer associated with each dependency list,
wherein the dependency list pointer points a thread to an initial task to be executed within its associated dependency list, and
wherein the dependency list pointer increments after the thread executes the initial task.

28. The direct solver system of claim 18, further comprising instructions to command the one or more processors to:
determine whether two or more tasks are assigned to a same level; and
upon determining that two or more tasks are assigned to the same level, executing the two or more tasks by a same thread.

29. The direct solver system of claim 18, further comprising a dependency list pointer associated with each dense block dependency list,
wherein the dependency list pointer includes a location in the dependency list of the level of the next task to be executed by a thread.

30. The direct solver system of claim 29, further comprising instructions to command the one or more processors to:
increment the dependency list pointer by one after the task execution.

31. The direct solver system of claim 18, further comprising instructions to command the one or more processors to cause the status of a dense block to change to −1 to indicate that a dense block has all tasks applied to the dense block and is ready to be factorized once a last task associated with a dense block has been executed.

32. The direct solver system of claim 18, further comprising instructions for each thread to be assigned a unique level based on a thread logical identifier (ID) and increment the unique level after each task completion by a same amount in order to keep unique task fetching based on a current thread level.

33. The direct solver system of claim 18, wherein each thread has a status, and wherein the status of each thread differs from the status of a dense block.

34. The direct solver system of claim 18, wherein the type of a task comprises a factor task, a solve task, or an update task.

35. A non-transitory computer-program product, tangibly embodied in a machine-readable non-transitory storage medium, the storage medium including instructions configured to cause a data processing apparatus to perform operations that include:
analyzing a symmetric matrix by defining a plurality of dense blocks;
identifying at least one task for each of the dense blocks;
identifying, for each task, any operations on which the task is dependent;
assigning a level to each of the tasks identified for each of the dense blocks, wherein a level represents a scheduled execution order for a task;
assigning a level to each of a plurality of threads to indicate a progress of each thread through factorization;
storing, in a first data structure, a dependency list for each of the dense blocks, wherein a dependency list includes levels of tasks that update a dense block;
storing, in a second data structure, a status for each of the dense blocks, wherein a stored status includes a level of a next task to update for the dense block associated with the status, and wherein the stored status is changeable by one or more threads;
assigning a plurality of the tasks to the plurality of threads, wherein each thread is assigned a unique task, and wherein each of the plurality of threads executes an assigned task when the status of the dense block that the assigned task updates matches the level of the thread executing the task; and
executing the tasks assigned to the threads,
wherein, when a task is completed, the status of the updated dense block is updated according to a type of the task completed.

36. The computer-program product of claim 35, wherein the second data structure is volatile.

37. The computer-program product of claim 35, wherein the statuses for each of the dense blocks can be atomically changed.

38. The computer-program product of claim 35, wherein a task is either a factor task, a solve task, or an update task and wherein a factor task involves factorizing a dense block, a solve task involves solving for one dense block using another dense block, and an update task involves generating and applying updates from two dense blocks to a third dense block.

39. The computer-program product of claim 35, wherein after completing their assigned tasks, the plurality of threads are assigned new tasks.

40. The computer-program product of claim 39, wherein after a factor task is executed, a status of a dense block is updated to indicate that the corresponding block is factorized and ready to be used by other tasks.

41. The computer-program product of claim 39, wherein after a solve task is executed, a status of a dense block is updated to indicate that the corresponding block is factorized and ready to be used by other tasks.

42. The computer-program product of claim 39, wherein after an update task is executed, a status of a dense block is updated to indicate that the corresponding block is ready to be factorized.

43. The computer-program product of claim 35, wherein two or more tasks are executed by a same thread when the two or more tasks are assigned a same level.

44. The computer-program product of claim 35, wherein the operations further include utilizing a dependency list pointer associated with each dependency list,
wherein the dependency list pointer points a thread to an initial task to be executed within its associated dependency list, and
wherein the dependency list pointer increments after the thread executes the initial task.

45. The computer-program product of claim 35, wherein the operations further include:
determining whether two or more tasks are assigned to a same level; and
upon determining that two or more tasks are assigned to the same level, executing the two or more tasks by a same thread.

46. The computer-program product of claim 35, further comprising utilizing a dependency list pointer associated with each dense block dependency list,
wherein a dependency list pointer includes a location in a dependency list of the level of the next task to be executed by a thread.

47. The computer-program product of claim 46, wherein the operations further include:
incrementing the dependency list pointer by one after the task execution.

48. The computer-program product of claim 35, wherein the status of a dense block is changed to −1 to indicate that a dense block has all tasks applied to the dense block and is ready to be factorized once a last task associated with a dense block has been executed.

49. The computer-program product of claim 35, wherein each thread is assigned a unique level based on a thread logical identifier (ID) and increments the unique level after each task completion by a same amount in order to keep unique task fetching based on a current thread level.

50. The computer-program product of claim 35, wherein each thread has a status, and wherein the status of each thread differs from the status of a dense block.

51. The computer-program product of claim 35, wherein the type of a task comprises a factor task, a solve task, or an update task.

* * * * *

UNITED STATES PATENT AND TRADEMARK OFFICE
CERTIFICATE OF CORRECTION

| | | |
|---|---|---|
| PATENT NO. | : 9,116,747 B2 | Page 1 of 1 |
| APPLICATION NO. | : 13/527670 | |
| DATED | : August 25, 2015 | |
| INVENTOR(S) | : Alexander Andrianov | |

It is certified that error appears in the above-identified patent and that said Letters Patent is hereby corrected as shown below:

In the Specification, column 5; line 20, please delete
"execute all updates $L_{1J}*L^T_{KJ}$ for K<=I"

And insert
--execute all updates $L_{IJ}*L^T_{KJ}$ for K<=I--

In the Claims, claim 1; line 36, please delete
"identifying at least one task for each of the dense blocks;"

And insert
--identifying at least one task for each of the dense blocks;
identifying, for each task, any operations on which the task is dependent;--

Signed and Sealed this
Twenty-ninth Day of December, 2015

Michelle K. Lee
*Director of the United States Patent and Trademark Office*